United States Patent
Phadtare et al.

(10) Patent No.: US 11,873,622 B2
(45) Date of Patent: Jan. 16, 2024

(54) AUTOMATED DETECTION OF MISTRACK CONDITIONS FOR SELF-PROPELLED WORK VEHICLES

(71) Applicant: Deere & Company, Moline, IL (US)

(72) Inventors: Amol Phadtare, Pune (IN); Balkrishna Joshilkar, Gadhinglaj (IN); Lance R. Sherlock, Asbury, IA (US); Pramod Karle, Bhosari (IN); Abhishek Garg, Udaipur (IN)

(73) Assignee: Deere & Company, Moline, IL (US)

( * ) Notice: Subject to any disclaimer, the term of this patent is extended or adjusted under 35 U.S.C. 154(b) by 162 days.

(21) Appl. No.: 17/576,510

(22) Filed: Jan. 14, 2022

(65) Prior Publication Data

US 2023/0228057 A1 Jul. 20, 2023

(51) Int. Cl.
*E02F 9/20* (2006.01)
*E02F 9/26* (2006.01)
*G01S 7/51* (2006.01)
*G01S 17/86* (2020.01)
*G01S 7/48* (2006.01)

(52) U.S. Cl.
CPC ........... *E02F 9/2045* (2013.01); *E02F 9/262* (2013.01); *G01S 7/4808* (2013.01); *G01S 7/51* (2013.01); *G01S 17/86* (2020.01)

(58) Field of Classification Search
CPC ......... E02F 9/2045; E02F 9/262; E02F 9/205; E02F 9/267; G01S 7/4808; G01S 7/51; G01S 17/86; G01S 17/88; G01S 17/931
See application file for complete search history.

(56) References Cited

U.S. PATENT DOCUMENTS

| | | | |
|---|---|---|---|
| 4,111,066 | A | 9/1978 | Kendrick |
| 6,477,914 | B1 | 11/2002 | Krieger |
| 7,477,973 | B2 | 1/2009 | Brewer et al. |
| 8,180,532 | B2 | 5/2012 | O'Halloran et al. |
| 9,638,525 | B1 | 5/2017 | Willis |
| 10,520,955 | B2 | 12/2019 | Garvin et al. |

(Continued)

FOREIGN PATENT DOCUMENTS

| | | |
|---|---|---|
| EP | 3495668 A1 | 6/2019 |
| EP | 3839266 A1 | 6/2021 |

(Continued)

*Primary Examiner* — Omeed Alizada
(74) *Attorney, Agent, or Firm* — Gary L. Montle; Lucian Wayne Beavers; Patterson Intellectual Property Law, PC

(57) ABSTRACT

A system and method are provided for determining mistrack conditions in work vehicles such as excavators having first and second tracks. A controller uses data from onboard sensors (e.g., cameras, lidar) having an external field of view to detect a first position of, e.g., a track of the work vehicle relative to a first external point in a local reference system independent of a global reference system and to detect, upon the work vehicle having advanced from the detected first position a predetermined distance, a second position of the at least first component of the work vehicle relative to a second external point in the local reference system. The controller further determines an amount of mistrack error corresponding to a difference between the detected second position and an expected second position, and generates an output signal based on the determined amount of mistrack error.

20 Claims, 5 Drawing Sheets

(56) References Cited

U.S. PATENT DOCUMENTS

| | | | |
|---|---|---|---|
| 11,157,017 B2* | 10/2021 | Yamamoto | ............... G08G 1/00 |
| 2014/0168009 A1 | 6/2014 | Peake | |
| 2016/0311481 A1 | 10/2016 | Grant et al. | |
| 2018/0208242 A1* | 7/2018 | Sakaguchi | ........... A01B 69/008 |
| 2019/0100205 A1 | 4/2019 | Kean et al. | |
| 2021/0088416 A1 | 3/2021 | Grenzi et al. | |
| 2021/0197907 A1 | 7/2021 | Hruska et al. | |
| 2021/0340731 A1 | 11/2021 | Takahashi et al. | |

FOREIGN PATENT DOCUMENTS

| | | |
|---|---|---|
| JP | 59139178 A | 8/1984 |
| WO | 2008129345 A1 | 10/2008 |
| WO | 2021130558 A1 | 7/2021 |

* cited by examiner

AUTOMATED DETECTION OF MISTRACK CONDITIONS FOR SELF-PROPELLED WORK VEHICLES

FIELD OF THE DISCLOSURE

The present disclosure relates generally to self-propelled work vehicles such as excavator, and for example to systems and methods for detecting mistrack conditions for such work vehicles. More particularly, the present disclosure relates to a system and method for automating various aspects of mistrack detection using for example onboard cameras and image processing.

BACKGROUND

Work vehicles within the scope of the present disclosure, which may also be referred to herein as work machines, may for example include not only hydraulic excavators but loaders, crawlers, motor graders, backhoes, forestry machines, front shovel machines, and others. These work vehicles, or at least versions of such vehicles which are the primary but non-exclusive focus of the present disclosure, may typically have tracked ground engaging units supporting a frame and/or undercarriage from the ground surface. Work vehicles as disclosed herein may include for example a work implement, which includes one or more components, that is used to modify the terrain based on control signals from and/or in coordination with movement of the work vehicle. In the context of an excavator as an exemplary work vehicle, the corresponding moving implements may be configured as a boom, an arm, a bucket, and the like (collectively a boom assembly), with actuators for moving the implements generally configured as hydraulic cylinders.

Travel mistrack is a known condition in the context of conventional self-propelled work vehicles, wherein for example each of left and right tracks on the work vehicle are commanded to move at an equivalent speed in a forward direction but for whatever reason one of the tracks travels at a faster speed than the other. Travel mistrack may generally lead to warranty failures and customer dissatisfaction, and it is therefore highly desirable to provide an efficient and easily implemented mechanism for detecting mistrack conditions as early as possible.

Unfortunately, conventional tools for mistrack condition detection do not include automated mechanisms, either at the factory or remotely for example at work sites, to accurately measure the travel mistrack and provide get the corresponding data and/or alerts to an operator in substantially real time.

Processes are currently utilized for measuring travel mistrack at the factory, but the processes are manually implemented and require a great deal of repetitive activity (e.g., one hour or more per work vehicle) and typically require two or more trained personnel to perform this task. There is a reasonable concern regarding the accuracy of such tests simply based on the human element of the process and the inherent flaws therein. In addition, conventional processes are presented with a further challenge in ensuring track parallelism at the beginning of the mistrack test, as having the tracks in a parallel orientation at this stage is arguably the most critical criteria for an accurate measurement and which otherwise may produce incorrect results.

BRIEF SUMMARY

The current disclosure provides an enhancement to conventional systems, at least in part by introducing a novel mistrack detection process that can be implemented in the field and automatically performed, or at least with a minimum of human interaction and therefore minimizing the impact of human error in the final calculation.

In a first exemplary embodiment, a method is disclosed herein for ascertaining a mistrack condition for a work vehicle comprising at least first and second ground engaging units configured to controllably propel the work vehicle across a ground surface. A first position of at least a first component of the work vehicle may be detected in a local reference system independent of a global reference system, using one or more onboard sensors. Upon advancing the work vehicle from the detected first position a predetermined distance, a second position of the at least first component of the work vehicle is detected in the local reference system, using the one or more onboard sensors. An amount of mistrack error is determined corresponding to a difference between the detected second position and an expected second position, and an output signal generated based on the determined amount of mistrack error.

In a second embodiment, one exemplary aspect according to the above-referenced first embodiment may include that operator selection may be enabled between at least a first operating mode of the work vehicle and a second operating mode wherein the mistrack condition is ascertained.

In a third embodiment, one exemplary aspect according to any one of the above-referenced first or second embodiments may further include that a substantially parallel arrangement of the at least first and second ground engaging units may be determined, with respect to each other and a forward direction of travel for the work vehicle, wherein upon determining the substantially parallel arrangement the operator is prompted for advancing of the work vehicle from the detected first position at least the predetermined distance.

The substantially parallel arrangement of the at least first and second ground engaging units may for example be determined by sensing respective orientations of the at least first and second ground engaging units with respect to a main frame of the work vehicle.

The substantially parallel arrangement of the at least first and second ground engaging units may further or in the alternative for example be determined using manual confirmation via a user interface comprising displayed grid lines corresponding to a reference object.

In a fourth embodiment, one exemplary aspect according to any one of the above-referenced first to third embodiments may include that the first position may be detected relative to a first external point and the second position may be detected relative to a second external point, wherein the first and second external points are further separated by the predetermined distance.

In a fifth embodiment, one exemplary aspect according to at least the above-referenced fourth embodiment may include that the first and second external points may respectively comprise first and second predetermined reference objects at specified positions. Detection of the first position of the at least first component of the work vehicle relative to the first predetermined reference object may accordingly comprise calculating a distance between the first component of the work vehicle and the first predetermined reference object, wherein the expected second position of the at least first component of the work vehicle relative to the second predetermined reference object is predicted based on the calculated distance between the first component of the work vehicle and the first predetermined reference object.

In a sixth embodiment, one exemplary aspect according to at least the above-referenced fourth embodiment may include that the first and second external points are manually selected in association with the mistrack determination, and the respective positions of the first and second external points are calculated in the local reference system. The expected second position of the at least first component of the work vehicle relative to the second external point may accordingly be predicted based on the calculated respective positions of the first and second external points and the predetermined distance for advancement of the work vehicle.

In a seventh embodiment, one exemplary aspect according to at least the above-referenced fourth embodiment may include that detecting the first position of the at least first component of the work vehicle relative to the first external point comprises calculating a distance between the first component of the work vehicle and the first external point by analyzing image data generated by the one or more onboard sensors comprising at least one camera, and detecting the second position of the at least first component of the work vehicle relative to the second external point comprises calculating a distance between the first component of the work vehicle and the second external point by analyzing further image data generated by the one or more onboard sensors comprising the at least one camera.

In an eighth embodiment, one exemplary aspect according to at least the above-referenced fourth embodiment may include that detecting the first position of the at least first component of the work vehicle relative to the first external point comprises calculating a distance between the first component of the work vehicle and the first external point by analyzing point cloud data generated by the one or more onboard sensors comprising at least one lidar sensor, and detecting the second position of the at least first component of the work vehicle relative to the second external point comprises calculating a distance between the first component of the work vehicle and the second external point by analyzing further point cloud data generated by the one or more onboard sensors comprising the at least one lidar sensor.

In a ninth embodiment, one exemplary aspect according to any one of the above-referenced first to eighth embodiments may include that the output signal may be generated and transmitted to a display unit for display of at least the determined amount of mistrack error.

In a tenth embodiment, one exemplary aspect according to any one of the above-referenced first to ninth embodiments may include that the output signal may be generated and transmitted to a display unit or audiovisual alarm based on the determined amount of mistrack error exceeding a predetermined criterion.

In an eleventh exemplary embodiment, a work vehicle as disclosed herein may include at least first and second ground engaging units supporting a main frame and configured to controllably propel the work vehicle across a ground surface, and one or more onboard sensors having an external field of view to at least one side of the work vehicle. A controller is functionally linked to the one or more onboard sensors and configured to direct the performance of steps in a method according to any one of the above-referenced first to tenth embodiments and optional exemplary aspects thereof.

Unless otherwise defined, all technical and scientific terms used herein have the same meaning as commonly understood by one of ordinary skill in the art to which this invention belongs. The present invention may be embodied in other specific forms without departing from the spirit or essential attributes thereof, and it is therefore desired that the present embodiment be considered in all aspects as illustrative and not restrictive. Any headings utilized in the description are for convenience only and no legal or limiting effect. Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-5, various embodiments may now be described of an inventive system and method.

Figure 1:
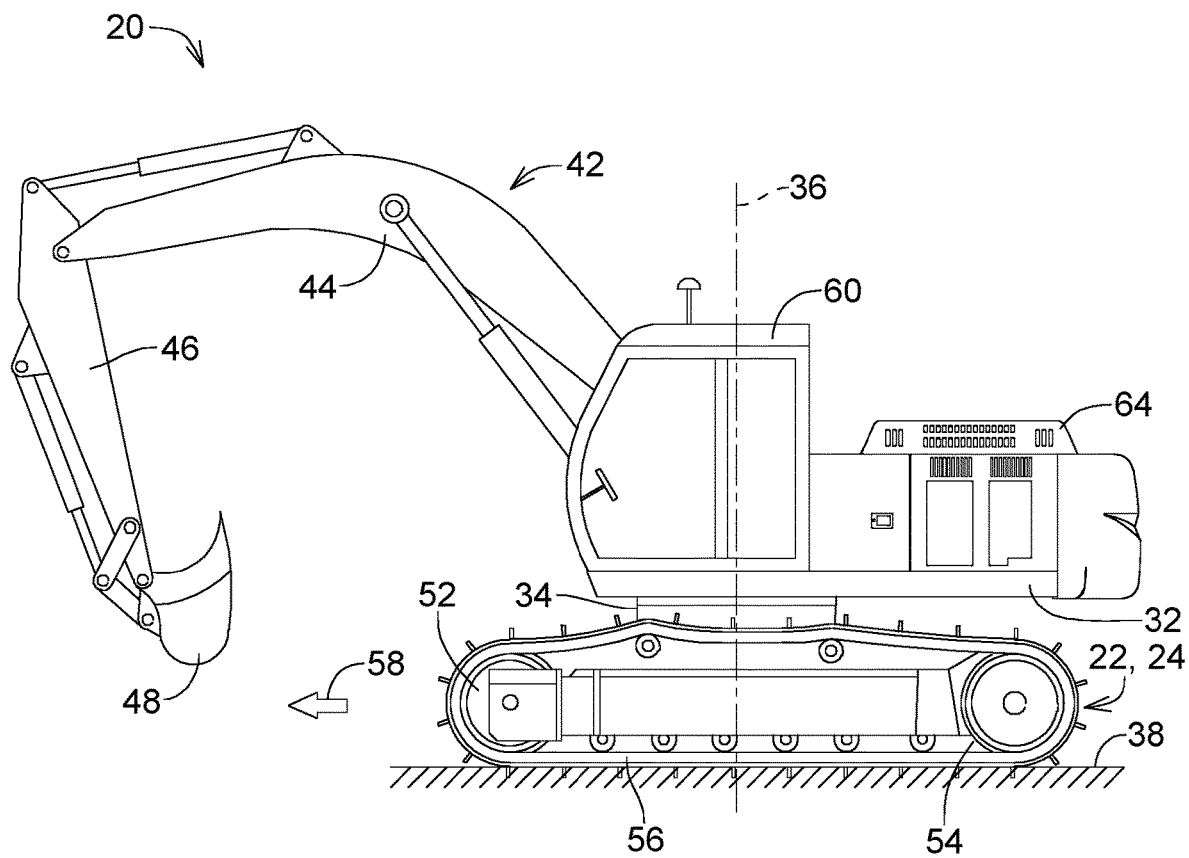
FIG. 1 is a side view of an exemplary embodiment of a self-propelled work vehicle according to the present disclosure.

FIG. 1 depicts a representative self-propelled work vehicle 20 in the form of, for example, a tracked excavator machine. The work vehicle 20 includes an undercarriage 22 including first and second ground engaging units 24 including first and second travel motors (not shown) for driving the first and second ground engaging units 24, respectively.

A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

In an embodiment, a swing angle sensor (not shown) may include an upper sensor part mounted on the main frame 32 and a lower sensor part mounted on the undercarriage 22. Such a swing angle sensor may be configured to provide a swing (or pivot) angle signal corresponding to a pivot position of the main frame 32 relative to the undercarriage 22 about the pivot axis 36. The swing angle sensor may for example be a Hall Effect rotational sensor including a Hall element, a rotating shaft, and a magnet, wherein as the angular position of the Hall element changes, the corresponding changes in the magnetic field result in a linear change in output voltage. Other suitable types of rotary position sensors include rotary potentiometers, resolvers, optical encoders, inductive sensors, and the like.

A work implement 42 in the context of the referenced work vehicle 20 includes a boom assembly 42 with a boom 44, an arm 46 pivotally connected to the boom 44, and a working tool 48. The term "implement" may be used herein to describe the boom assembly (or equivalent thereof) collectively, or individual elements of the boom assembly or equivalent thereof. The boom 44 is pivotally attached to the main frame 32 to pivot about a generally horizontal axis relative to the main frame 32. The working tool in this embodiment is an excavator shovel (or bucket) 48 which is pivotally connected to the arm 46. The boom assembly 42 extends from the main frame 32 along a working direction of the boom assembly 42. The working direction can also be described as a working direction of the boom 44. As described herein, control of the work implement 42 may relate to control of any one or more of the associated components (e.g., boom 44, arm 46, tool 48).

It is within the scope of the present disclosure that the work vehicle 20 may take various alternative forms and further utilize alternative work implements 42 to modify the proximate terrain.

In the embodiment of FIG. 1, the first and second ground engaging units 24 are tracked ground engaging units. Each of the tracked ground engaging units 24 includes an idler 52, a drive sprocket 54, and a track chain 56 extending around the idler 52 and the drive sprocket 54. The travel motor of each tracked ground engaging unit 24 drives its respective drive sprocket 54. Each tracked ground engaging unit 24 is represented as having a forward traveling direction 58 defined from the drive sprocket 54 toward the idler 52. The forward traveling direction 58 of the tracked ground engaging units 24 also defines a forward traveling direction 58 of the undercarriage 22 and thus of the work vehicle 20. In some applications, including uphill travel as further discussed below, the orientation of the undercarriage 22 may be reversed such that a traveling direction of the work vehicle 20 is defined from the idler 52 toward its respective drive sprocket 54, whereas the work implement(s) 42 is still positioned ahead of the undercarriage 22 in the traveling direction.

An operator's cab 60 may be located on the main frame 32. The operator's cab 60 and the boom assembly 42 may both be mounted on the main frame 32 so that the operator's cab 60 faces in the working direction 58 of the boom assembly. A control station (not shown) may be located in the operator's cab 60.

Also mounted on the main frame 32 is an engine 64 for powering the work vehicle 20. The engine 64 may be a diesel internal combustion engine. The engine 64 may drive a hydraulic pump to provide hydraulic power to the various operating systems of the work vehicle 20.

Figure 2:
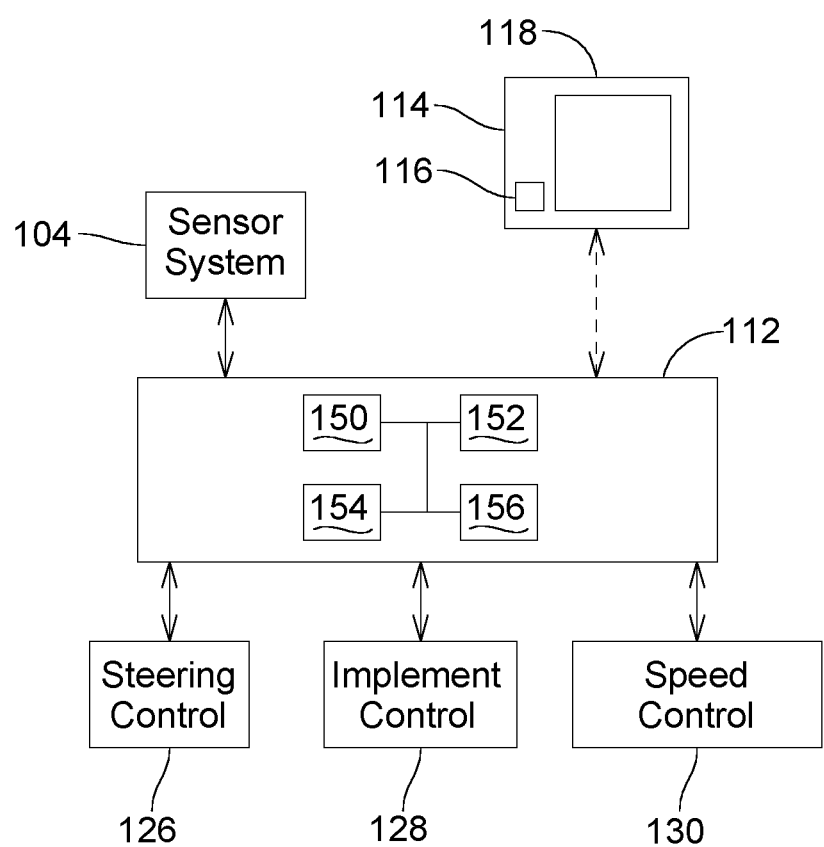
FIG. 2 is a block diagram representing a control system according to an embodiment of the present disclosure.

As schematically illustrated in FIG. 2, the self-propelled work vehicle 20 includes a control system including a controller 112. The controller 112 may be part of the machine control system of the work vehicle 20, or it may be a separate control module.

The controller 112 is configured to receive input signals from some or all of various sensors collectively defining a sensor system 104. Various sensors in the sensor system 104 may typically be discrete in nature, but signals representative of more than one input parameter may be provided from the same sensor, and the sensor system 104 may further refer to signals provided from the machine control system.

Figure 3:
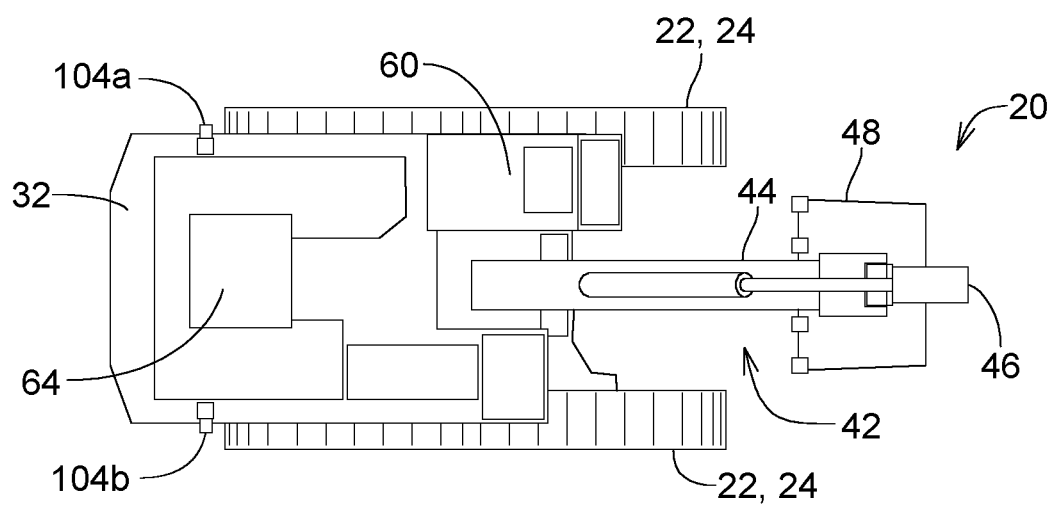
FIG. 3 is an overhead view of the work vehicle of FIG. 1, representing exemplary sensor positions for capturing data corresponding to the surroundings of the work vehicle.

In particular embodiments as described in more detail below, and with illustrative reference to FIG. 3, the sensor system 104 may be referred to as a camera system including a plurality of imaging devices such as cameras 104a, 104b mounted on the main frame 32 of the self-propelled work vehicle 20 and arranged to capture images corresponding to surroundings of the self-propelled work vehicle 20. The sensor system 104 may include video cameras configured to record an original image stream and transmit corresponding data to the controller 112. In the alternative or in addition, the sensor system 104 may include one or more of an infrared camera, a stereoscopic camera, a PMD camera, lidar sensors, ultrasonic sensors, laser scanners, radar wave transmitters and receivers, thermal sensors, and the like. The number and orientation of said cameras may vary in accordance with the type of work vehicle and relevant applications. In the illustrated embodiment of FIG. 3, a first camera 104a is positioned on a left side of the work vehicle 20 and configured to capture images in a first field of view, and a second camera 104b is positioned on a right side of the work vehicle 20 and configured to capture images in a second field of view. The position and size of an image region recorded by a respective camera 104a, 104b may depend on the arrangement and orientation of the camera and the camera lens system, and a particular such arrangement and/or orientation is not required within the scope of the present disclosure unless otherwise specifically noted.

In embodiments within the scope of the present disclosure, a user interface associated with for example a telematics platform may be configured to display any one or more of the captured images simultaneously, user-selectively, in accordance with an automated selection based on priority for a given identified object in the image, and the like.

The sensor system 104 may in various embodiments further include other sensors as known in the art for use with different types of work vehicles 20, such as for example inertial measurement units (IMUs) mounted to respective components of the work implement 42 and/or main frame 32, sensors coupled to piston-cylinder units to detect the relative hydraulically actuated extensions thereof, or any known alternatives as may be known to those of skill in the art. In various embodiments, additional sensors may be provided to detect machine operating conditions or positioning, including for example an orientation sensor, global positioning system (GPS) sensors, vehicle speed sensors, and the like, and whereas one or more of these sensors may be discrete in nature the sensor system may further refer to signals provided from the machine control system. In an embodiment, any of the aforementioned sensors may be supplemented using radio frequency identification (RFID) devices or equivalent wireless transceivers on one or more components of the work implement 42, the main frame 32, or the like. Such devices may for example be implemented to determine and/or confirm a distance and/or orientation between the respective work vehicle component and an external object. Still further sensors may be incorporated which generate output signals corresponding to a specific work vehicle condition, such as for example whether a door or panel is open or closed.

One or more sensors of the sensor system 104 may collectively define an obstacle detection system, alone or in combination with one or more of the other aforementioned sensors for improved data collection. The types and combinations of sensors for obstacle detection may vary for a type of work vehicle, work area, and/or application, but generally may be provided and configured to optimize recognition of objects proximate to, or otherwise in association with, a determined working area of the vehicle.

Returning to FIGS. 1 and 2, the controller 112 may be configured to produce outputs, as further described below, to a user interface 114 associated with a remote computing device 118 for display to the human operator. Also as further described below, the controller 112 may be configured to receive inputs from the remote computing device 118, such as user input provided via the user interface 114.

An exemplary user interface 114 as disclosed herein may be associated with a program application generating a display on a remote computing device 118 such as a cell phone or tablet computer including a display unit, for example a touchscreen interface. The user interface 114 may selectively display outputs such as captured images and status indications and/or otherwise enable user interaction such as the providing of inputs to the system. Such inputs may be provided via interface tools 116 such as buttons or the like associated with the user interface 114, such as for example rendered as part of a touchscreen display or otherwise as a discrete input/output device 116. In the context of a remote user interface 114 as generally described herein, data transmission between for example the vehicle control system and the user interface 114 may take the form of a wireless communications system and associated components as are conventionally known in the art. In certain embodiments, a remote user interface 114 and vehicle control systems for respective work vehicles 20 may be further coordinated or otherwise interact with a remote server or other computing device for the performance of operations in a system as disclosed herein.

The controller 112 may in various embodiments be configured to generate control signals for controlling the operation of respective actuators, or signals for indirect control via intermediate control units, associated with a machine steering control system 126, a machine implement control system 128, and an engine speed control system 130. The control systems 126, 128, 130 may be independent or otherwise integrated together or as part of a machine control unit in various manners as known in the art. The controller 112 may for example generate control signals for controlling the operation of various actuators, such as hydraulic motors or hydraulic piston-cylinder units (not shown), and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112.

The controller 112 includes or may be associated with a processor 150, a computer readable medium 152, a communication unit 154, and data storage 156 such as for example a database network. It is understood that the controller 112 described herein may be a single controller having some or all of the described functionality, or it may include multiple controllers wherein some or all of the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium 152 can be coupled to the processor 150 such that the processor 150 can read information from, and write information to, the memory/storage medium 152. In the alternative, the medium 152 can be integral to the processor 150. The processor 150 and the medium 152 can reside in an application specific integrated circuit (ASIC). The ASIC can reside in a user terminal. In the alternative, the processor 150 and the medium 152 can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor 150 can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller 112 and external systems or devices, and/or support or provide communication interface with respect to internal components of the self-propelled work vehicle 20. The communications unit may include wireless communication system components (e.g., via cellular modem, WiFi, Bluetooth or the like) and/or may include one or more wired communications terminals such as universal serial bus ports.

The data storage 156 as further described below may, unless otherwise stated, generally encompass hardware such as volatile or non-volatile storage devices, drives, electronic memory, and optical or other storage media, as well as in certain embodiments one or more databases residing thereon.

Figure 4:
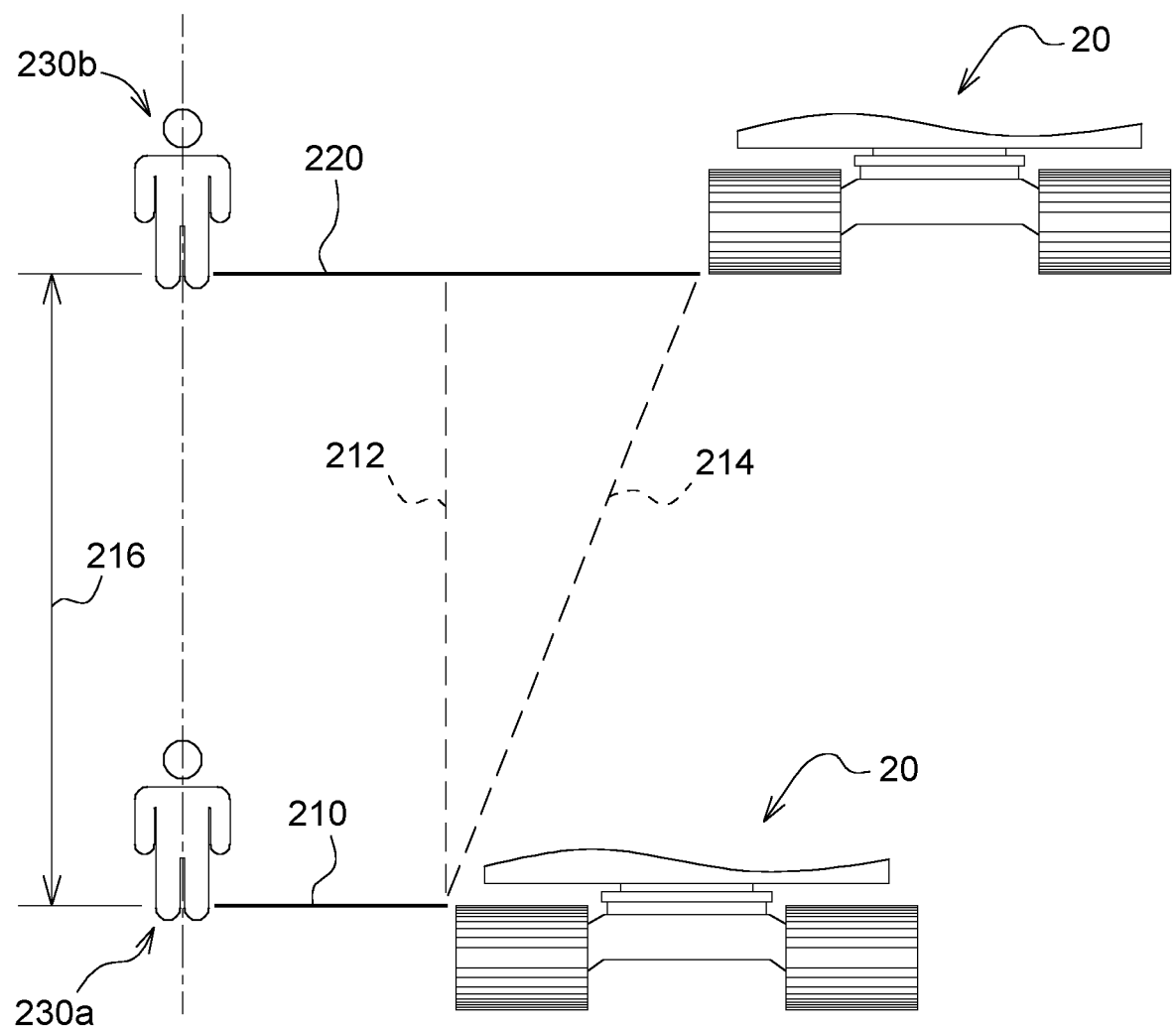
FIG. 4 is a diagram representing an exemplary operation according to various embodiments of a method as disclosed herein.
Figure 5:
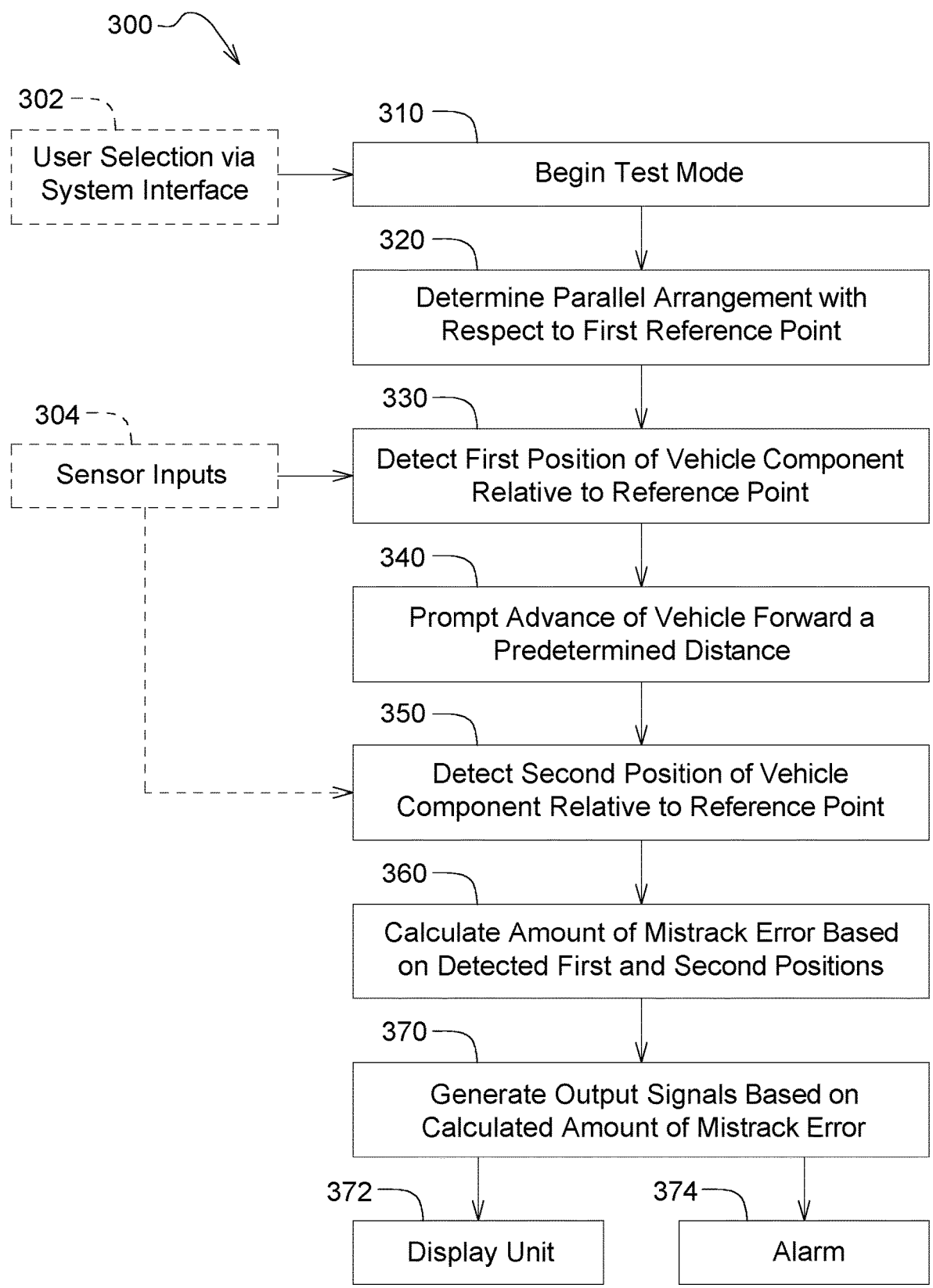
FIG. 5 is a flowchart representing an exemplary embodiment of a method as disclosed herein.

Referring next to FIGS. 4 and 5, an exemplary embodiment of a method 300 may now be described in at least the context of determining mistrack conditions. In an embodiment as shown, a mistrack test mode 310 may be selectively implemented based on user input from a user interface 114 (step 302), but in alternative embodiments the test mode may be programmatically implemented or otherwise prompted to the user for implementation based upon, e.g., a period of time and/or distance travelled since the last test, a detected trigger with respect to monitored movements of the work vehicle 20, or the like.

An initial step 320 upon beginning the test mode 310 may be to determine whether or not the tracked ground engaging units are in a sufficiently parallel arrangement with respect to a first reference point, and otherwise further to enable correction of the track positions by the operator. In an embodiment, detection may be enabled through the use of one or more grid lines generated on images via an onboard display unit with respect to an intended forward path or with respect to a reference point or object (i.e., perpendicular to the intended forward path), wherein for example the system may be configured to automatically determine the parallel arrangement of the tracks based on an intersection of the grid lines with each of the reference point and one or more predetermined components or locations on the work vehicle, or where the parallel arrangement may be manually confirmed and signaled to the system by an operator upon reviewing the displayed images comprising the grid lines and the reference point or object in the field of view.

The method 300 continues in step 330 by detecting a first position of at least one work vehicle 20 component relative to the first reference point, based on inputs from one or more sensors of the sensor system 104. In an embodiment as represented in FIG. 4, a first distance 210 may be measured between the work vehicle 20 and a first reference point (e.g., reference dummy) 230a. The distance may for example be measured by processing images captured from a camera mounted on an appropriate side of the work vehicle, for example using a proprietary or open source framework such as Python, computer vision and machine learning (CVML) techniques, and the like, but in alternative embodiments the distance may be calculated based on signals received from various other types of sensors as previously noted herein.

Image processing and associated machine learning techniques may in some embodiments be performed onboard the work vehicle via the above-referenced controller or a processing unit functionally linked thereto, but in other embodiments a remote processing unit such as for example a cloud platform may be utilized in functional communication with the controller to receive captured images and perform some or all of the image processing, object detection, and distance calculation.

The machine learning techniques for example including dataset training for the image processing functions as disclosed herein may generally be implemented in a manner understood by those of skill in the art.

In an embodiment, one or more stored machine learning models may correspond to respective locations for performing a mistrack test, wherein for example the system automatically recognizes a given location and retrieves a corresponding machine learning model for facilitating object recognition and distance calculations during relevant portions of the test, or where the system may receive inputs associated with a given location and apply the corresponding machine learning model accordingly.

With a parallel arrangement of the tracks having been confirmed, and an initial position of the work vehicle determined with respect to the first reference point, the method 300 continues in step 340 by prompting the operator to advance the work vehicle 20 a predetermined forward distance 216, such as for example twenty meters, along an intended path 212 transverse with respect to for example a hypothetical grid line connecting the work vehicle and the first reference point 230a. Depending on an amount of mistrack, however, the actual path traveled 214 may not be straight but instead angled to the left or to the right (to the left in the illustrated example) of the intended path 212.

After completing the forward travel of the predetermined distance, the method 300 continues in step 350 by detecting a second position of at least one work vehicle 20 component relative to a second reference point 230b, or in some embodiments alternatively relative to the first reference point 230a, based on further inputs from the sensor system 104. In the illustrated embodiment, a second distance 220 may be measured between the work vehicle 20 and a second reference point (e.g., reference dummy) 230b and stored for subsequent retrieval. As with the above-referenced example, the distance may be measured by processing images captured from a camera mounted on an appropriate side of the work vehicle, for example using a proprietary or open source framework such as Python, computer vision and machine learning (CVML) techniques, and the like. In alternative embodiments the distance may be calculated based on signals received from various other types of sensors as previously noted herein.

Based on the detected first and second positions, an amount of mistrack error can be calculated in step 360. For example, assuming that the first and second reference points 230a, 230b are properly arranged, the distance 210 from the work vehicle 20 to the first reference point 230a should theoretically match the distance 220 from the work vehicle 20 to the second reference point 230b with zero mistrack, whereas any difference between the measured/calculated distances may be attributed to mistrack error.

In certain embodiments wherein a single reference point 230 is identified by the system and utilized as a common reference point in place of the distinct first and second reference points 230a, 230b, the distances between the work vehicle and the common reference point may still be measured/calculated at each of the first position (for at least the purpose of calculating an expected second position once the tracks have been arranged in parallel) and at the second position (for the purpose of calculating a difference with respect to the expected second position).

In an embodiment, rather than calculating a distance between the work vehicle 20 and one or more external reference points 230a, 230b, respective first and second positions of the work vehicle may be determined in a local reference system (i.e., independent of a global reference system) using the sensor system 204. Based on the detected first position, the method in such an embodiment may further include predicting the second position of the work vehicle 20 after the predetermined distance forward has been traversed, wherein a difference between the predicted or expected second position and an actual determined second position of the work vehicle is provided as the mistrack error for a given test.

In another embodiment, first and second reference points 230a, 230b may be manually selected via the onboard user interface in association with an initiated mistrack test mode. The first and second reference points 230a, 230b in this context may be points or objects that have been positioned specifically for this purpose and at a predetermined distance 216 apart, but may alternatively be merely two selected points external to the work vehicle, and wherein the respective positions of the first and second external points 230a, 230b may be calculated in the local (i.e., non-global) reference system associated with the work vehicle 20. In this embodiment, an expected second position of the work vehicle 20 (or relevant component thereof) relative to the second reference point 230b may be predicted based on the calculated respective positions of the first and second external points 230a, 230b and the predetermined distance 216 for advancement of the work vehicle.

Based on a calculated amount of mistrack error, the method 300 may continue in step 370 with the generation of output signals corresponding to the amount of mistrack error. Output signals may be generated to a display unit 372, such as for example a local display unit mounted inside the work vehicle 20 or a remote display unit, and/or to an alarm unit which may be audio, visual, audiovisual, or the like for conveying the presence (or lack) of a mistrack condition. The output signals may in some embodiments be selectively generated only upon the amount of mistrack error exceeding a threshold value corresponding to a mistrack condition (e.g., exceeding an allowable deviation of 300 millimeters after a forward travelling distance of 20 meters in a straight line), or if a mistrack condition is determined based on a non-threshold-based analysis and/or considering prior test results. The output signals may in some embodiments be generated for any test results such as for example to display a current measurement to the operator regardless of whether a mistrack condition has been determined. The output signals in some embodiments may be generated to a controller to convey a current mistrack measurement in all contexts, and further selectively generated to a display unit dependent on whether a mistrack condition is determined which requires attention or even intervention.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of ascertaining a mistrack condition for a work vehicle comprising at least first and second ground engaging units configured to controllably propel the work vehicle across a ground surface, the method comprising:
   detecting a first position of at least a first component of the work vehicle in a local reference system independent of a global reference system, using one or more onboard sensors;
   upon advancing the work vehicle from the detected first position a predetermined distance, detecting a second position of the at least first component of the work vehicle in the local reference system, using the one or more onboard sensors;
   determining an amount of mistrack error corresponding to a difference between the detected second position and an expected second position; and
   generating an output signal based on the determined amount of mistrack error.

2. The method of claim 1, further comprising enabling operator selection between at least a first operating mode of the work vehicle and a second operating mode wherein the mistrack condition is ascertained.

3. The method of claim 1, further comprising:
   determining a substantially parallel arrangement of the at least first and second ground engaging units, with respect to each other and a forward direction of travel for the work vehicle; and
   upon determining the substantially parallel arrangement, prompting the operator for advancing of the work vehicle from the detected first position at least the predetermined distance.

4. The method of claim 3, wherein the substantially parallel arrangement of the at least first and second ground engaging units is determined by sensing respective orientations of the at least first and second ground engaging units with respect to a main frame of the work vehicle.

5. The method of claim 3, wherein the substantially parallel arrangement of the at least first and second ground engaging units is determined using manual confirmation via a user interface comprising displayed grid lines corresponding to a reference object.

6. The method of claim 1, wherein the first position is detected relative to a first external point and the second position is detected relative to a second external point, and the first and second external points are separated by the predetermined distance.

7. The method of claim 6, wherein the first and second external points respectively comprise first and second predetermined reference objects at specified positions.

8. The method of claim 7, wherein:
   detecting the first position of the at least first component of the work vehicle relative to the first predetermined reference object comprises calculating a distance between the first component of the work vehicle and the first predetermined reference object, and
   the expected second position of the at least first component of the work vehicle relative to the second predetermined reference object is predicted based on the calculated distance between the first component of the work vehicle and the first predetermined reference object.

9. The method of claim 6, wherein the first and second external points are manually selected in association with the mistrack determination, and the respective positions of the first and second external points are calculated in the local reference system.

10. The method of claim 9, wherein:
    the expected second position of the at least first component of the work vehicle relative to the second external point is predicted based on the calculated respective positions of the first and second external points and the predetermined distance for advancement of the work vehicle.

11. The method of claim 6, wherein:
    detecting the first position of the at least first component of the work vehicle relative to the first external point comprises calculating a distance between the first component of the work vehicle and the first external point by analyzing image data generated by the one or more onboard sensors comprising at least one camera; and
    detecting the second position of the at least first component of the work vehicle relative to the second external point comprises calculating a distance between the first component of the work vehicle and the second external point by analyzing further image data generated by the one or more onboard sensors comprising the at least one camera.

12. The method of claim 6, wherein:
    detecting the first position of the at least first component of the work vehicle relative to the first external point comprises calculating a distance between the first component of the work vehicle and the first external point by analyzing point cloud data generated by the one or more onboard sensors comprising at least one lidar sensor; and
    detecting the second position of the at least first component of the work vehicle relative to the second external point comprises calculating a distance between the first component of the work vehicle and the second external point by analyzing further point cloud data generated by the one or more onboard sensors comprising the at least one lidar sensor.

13. The method of claim 1, wherein the output signal is generated and transmitted to a display unit for display of at least the determined amount of mistrack error.

14. The method of claim 1, wherein the output signal is generated and transmitted to a display unit or audiovisual alarm based on the determined amount of mistrack error exceeding a predetermined criterion.

15. A work vehicle comprising:
    at least first and second ground engaging units supporting a main frame and configured to controllably propel the work vehicle across a ground surface;
    one or more onboard sensors having an external field of view to at least one side of the work vehicle; and
    a controller functionally linked to the one or more onboard sensors and configured to:
      detect a first position of at least a first component of the work vehicle relative to a first external point in a local reference system independent of a global reference system, using data provided from the one or more onboard sensors;
      detect, upon the work vehicle having advanced from the detected first position a predetermined distance, a second position of the at least first component of the work vehicle relative to a second external point in the local reference system, using further data provided from the one or more onboard sensors;

determine an amount of mistrack error corresponding to a difference between the detected second position and an expected second position; and generate an output signal based on the determined amount of mistrack error.

16. The work vehicle of claim 15, wherein the controller is further configured to:

determine a substantially parallel arrangement of the at least first and second ground engaging units, with respect to each other and a forward direction of travel for the work vehicle; and upon determining the substantially parallel arrangement, to prompt the operator for advancing of the work vehicle from the detected first position at least the predetermined distance.

17. The work vehicle of claim 16, wherein the substantially parallel arrangement of the at least first and second ground engaging units is determined using manual confirmation via a user interface comprising displayed grid lines corresponding to a reference object.

18. The work vehicle of claim 15, wherein the first and second external points respectively comprise first and second predetermined reference objects at specified positions, and the controller is configured to:

detect the first position of the at least first component of the work vehicle relative to the first predetermined reference object comprises calculating a distance between the first component of the work vehicle and the first predetermined reference object, and the expected second position of the at least first component of the work vehicle relative to the second predetermined reference object is predicted based on the calculated distance between the first component of the work vehicle and the first predetermined reference object.

19. The work vehicle of claim 15, wherein:

detecting the first position of the at least first component of the work vehicle relative to the first external point comprises calculating a distance between the first component of the work vehicle and the first external point by analyzing image data generated by the one or more onboard sensors comprising at least one camera; and detecting the second position of the at least first component of the work vehicle relative to the second external point comprises calculating a distance between the first component of the work vehicle and the second external point by analyzing further image data generated by the one or more onboard sensors comprising the at least one camera.

20. The work vehicle of claim 15, wherein:

detecting the first position of the at least first component of the work vehicle relative to the first external point comprises calculating a distance between the first component of the work vehicle and the first external point by analyzing point cloud data generated by the one or more onboard sensors comprising at least one lidar sensor; and detecting the second position of the at least first component of the work vehicle relative to the second external point comprises calculating a distance between the first component of the work vehicle and the second external point by analyzing further point cloud data generated by the one or more onboard sensors comprising the at least one lidar sensor.

* * * * *